(12) United States Patent
Okabe et al.

(10) Patent No.: US 6,184,599 B1
(45) Date of Patent: Feb. 6, 2001

(54) COOLING ARRANGEMENT FOR GENERATOR

(75) Inventors: Yoshihiko Okabe; Hitoshi Motose, both of Hamamatsu (JP)

(73) Assignee: Sanshin Kogyo Kabushiki Kaisha (JP)

( * ) Notice: Under 35 U.S.C. 154(b), the term of this patent shall be extended for 0 days.

(21) Appl. No.: 09/313,015

(22) Filed: May 17, 1999

(30) Foreign Application Priority Data

May 15, 1998 (JP) .................................................. 10-132789

(51) Int. Cl.⁷ .................................. H02K 1/32; H02K 9/00
(52) U.S. Cl. .................................. 310/64; 310/54; 310/57
(58) Field of Search .................................. 310/52, 54, 64, 310/65, 178, 58, 57; 440/85; 123/41.31

(56) References Cited

U.S. PATENT DOCUMENTS

| | | | |
|---|---|---|---|
| 4,032,807 | * 6/1977 | Richter | 310/178 |
| 4,632,662 | 12/1986 | Handa | 440/52 |
| 5,078,101 | * 1/1992 | Anderson et al. | 123/41.31 |
| 5,207,186 | 5/1993 | Okita | 123/41.31 |
| 5,234,363 | 8/1993 | Motose | 440/77 |
| 5,706,783 | 1/1998 | Sawada | 123/417 |
| 5,816,218 | * 10/1998 | Motose | 123/479 |
| 5,883,449 | * 3/1999 | Mehta et al. | 310/60 R |

* cited by examiner

*Primary Examiner*—Clayton LaBalle
*Assistant Examiner*—Guillermo Perez
(74) *Attorney, Agent, or Firm*—Knobbe, Martens, Olson & Bear, LLP

(57) ABSTRACT

An outboard motor comprises an engine contained within an engine compartment formed within a power head of the motor. The engine includes a generator having a stator and a rotor. The stator is cooled by a cooling component to reduce the operating temperature of the stator. The cooling component generally comprises a heat transfer plate or cooling jacket that is positioned adjacent to at least a portion of the stator to usher heat build-up away from the stator portion of the generator. The cooling jacket may be in fluid communication with other cooling jackets or may be a discrete system that is separate and distinct from other cooling systems of the motor.

19 Claims, 7 Drawing Sheets ized. The heat transfer element is positioned between the
COOLING ARRANGEMENT FOR GENERATOR

BACKGROUND OF THE INVENTION

1. Field of the Invention

The present invention generally relates to electrical generator systems for engines.

More specifically, the present invention relates to a cooling arrangement for such systems.

2. Description of Related Art

Engines commonly employ electrical generators for powering various on-board electrical equipment. These generators, as is known, employ a rotor and a stator to create an electrical current. Specifically, as the rotor rotates within the stator, the movement creates an alternating current of electricity that is largely dependent upon the speed of the rotation. In some relevant embodiments, the stator is mounted to a housing that carries one of the bearings used to support the crankshaft. In such embodiments, the rotor is affixed to the crankshaft such that the rotor is rotated as the crankshaft turns.

Due to the difficulties associated with cooling the generators, most conventional generators are structured for low power generating capacity. While such structuring is suitable for some applications, engines employing the latest fuel injectors and control systems commonly drain more electrical power than the low power generators can supply. For instance, some fuel injectors may employ solenoids that require a large amount of power to simply inject the fuel as desired. In such instances, a 25 amp generator may not supply adequate capacity for a system designed to require as much as 45 amps of power.

Accordingly, the power generating capacity required of the stators of the generators has greatly increased while the heat generation remains a problem. Accordingly, with the required increase in power generating capacity comes a potentially damaging increase in temperature. An alternative to the standard rotor and stator generator is to employ a separate alternator that may be individually cooled; however, such a solution increases the bulk of the engine and results in increased weight and a greater weight distribution. Moreover, to accommodate the increased engine size, the cowling and the outboard motor may reflect a similar increase in size.

SUMMARY OF THE INVENTION

Accordingly, it may be advantageous to provide a cooling arrangement for a generator to enable increased power generating capabilities. Moreover, such a cooling arrangement should be structured to not significantly increase the overall motor size and weight. For instance, a portion of the generator may be compactly mounted to a bearing carrier for the crankshaft while the other portion is mounted to the crankshaft.

Thus, one aspect of the present invention involves an outboard motor comprising an engine having a crankshaft extending in a generally vertical direction. A bearing housing supports a portion of the crankshaft. A generator is positioned proximate the portion of the crankshaft extending from the engine. The generator comprises an armature and a rotor with the armature supported by the bearing housing. The armature generally comprises a stator and a plurality of coils. A heat transfer element is positioned between the stator and the bearing housing.

Another of the present invention involves a generator and cooling arrangement comprising a rotor and an armature. The rotor has at least one surface generally facing the armature. The rotor carries at least one magnet on the surface facing the armature while the armature generally comprises a stator and a plurality of coils attached to the stator. The coils are positioned in close proximity to a circumference defined through the magnet from a center of rotation of the magnet about the armature. A cooling member is positioned adjacent to the armature and has a component made of a thermally conductive material.

BRIEF DESCRIPTION OF THE DRAWINGS

These and other features, aspects and advantages of the present invention will now be described with reference to the drawings of preferred embodiments, which embodiments are intended to illustrate and not to limit the invention, and in which drawings.

DETAILED DESCRIPTION OF THE PREFERRED EMBODIMENTS OF THE INVENTION

Figure 1:
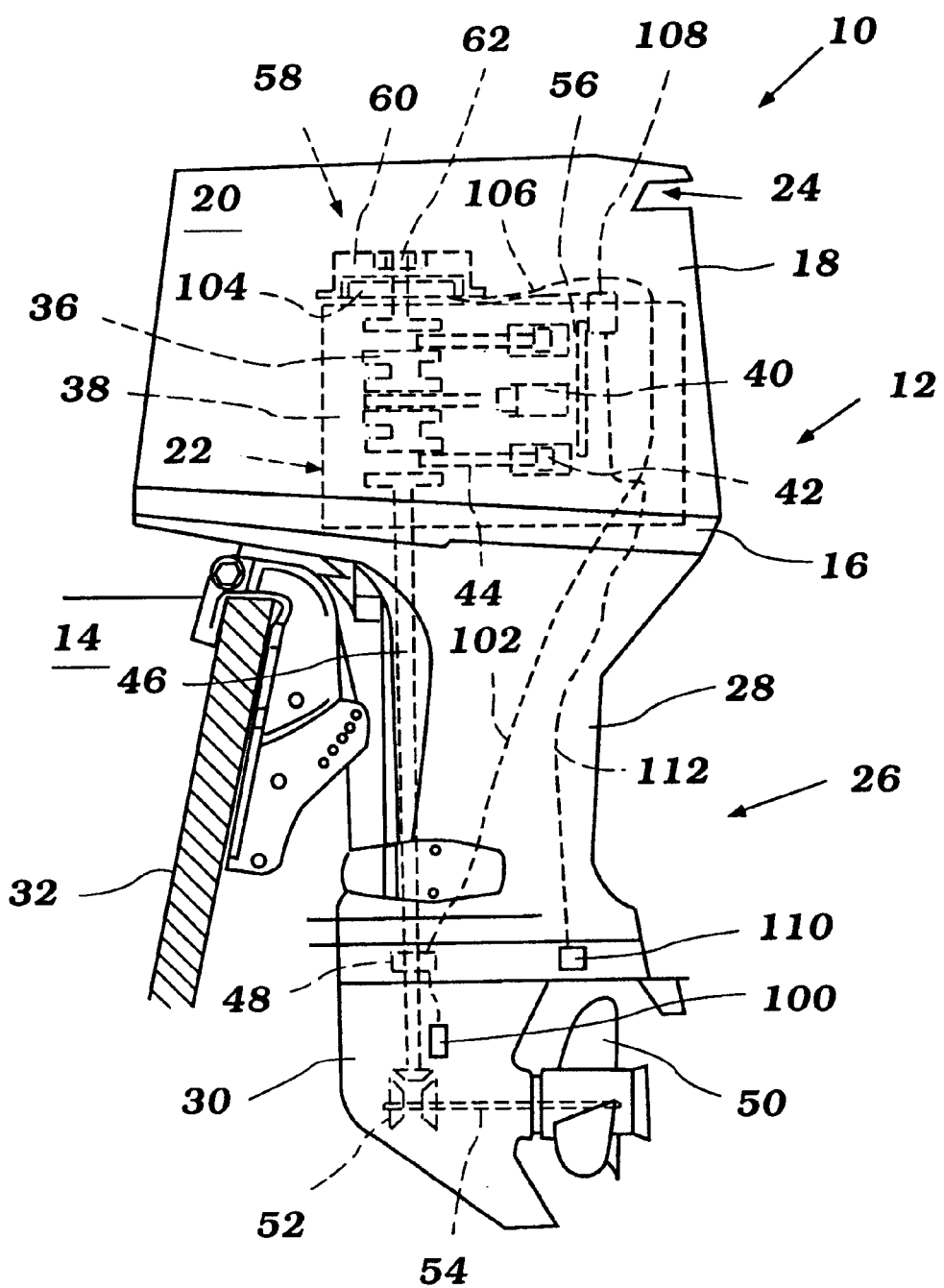
FIG. 1 is a side view of an outboard motor having an electrical generator cooling arrangement having features, aspects and advantages in accordance with the present invention and having certain internal components illustrated with hidden lines.

With initial reference to FIG. 1, an outboard motor for powering watercraft is illustrated. The outboard motor, indicated generally by the reference numeral 10, advantageously has a generator cooling arrangement having certain features, aspects and advantages of the present invention. The outboard motor 10 provides an exemplary environment in which the cooling arrangement has particular utility. It is anticipated, however, that the cooling arrangement may also find utility in other engine applications having liquid cooled components or air cooled components. For example, but without limitation, the present cooling arrangement may find utility with automobiles, trucks, motorcycles, watercraft, and other applications featuring an internal combustion engine powering an electrical generator. Other uses may also readily present themselves to individuals having ordinary skill in the relevant arts.

With continued reference to FIG. 1, the illustrated outboard motor 10 features a power head 12 that is attached to a watercraft 14. The method of attachment, while relatively unimportant to the present cooling arrangement, will be described in more detail below. The power head 12 generally comprises a lower tray portion 16 and an upper cowling portion 18. These power head components may be manufactured of any suitable material, including, without limitation, reinforced plastics, fiberglass and metals, in any known manner. The lower tray portion 16 and the upper cowling portion 18 preferably are joined together such that the power head area 12 is substantially weatherproof and water spray resistant. For instance, a rubber seal (not shown) may be positioned in the joining region. Moreover, the lower tray portion 16 and the upper cowling portion 18 form a substantially enclosed engine compartment 20. In one embodiment, the engine compartment 20 is sized and configured to tightly accommodate an engine 22 to reduce the overall size and weight of the outboard motor 10.

In the embodiment of FIG. 1, an air vent or air inlet area 24, which may face rearward in some embodiments and forward in others, is provided in the upper cowling portion 16. Additionally, additional air inlets may be formed in increase or enhance a circulation of air throughout the engine compartment 20. Air may enter through the vent 24 for induction into the engine 22 through that any suitable induction system. The air vent 24 may also allow heated air to be exhausted from within the engine compartment 20 after circulation therein.

With continued reference to FIG. 1, the illustrated outboard motor 10 further comprises a lower unit 26. The lower unit 26 preferably extends downward from the lower tray portion 16 of the power head area 12. The illustrated lower unit 26 generally comprises an enlarged upper casing 28 and a narrower lower casing 30. Generally, the illustrated upper casing 28 is connected to the lower tray portion 16 in any known manner such that the upper casing 28 may support the lower tray portion16 and the balance of the power head 12. Additionally, the upper casing 28 and the lower casing 30 may be joined in any suitable manner or may be manufactured as an integral unit from any suitable material. Such assemblies and materials are well known to those of ordinary skill in the art.

As shown in FIG. 1, the illustrated outboard motor 10 is generally attached to a transom 32 of a watercraft 14 using a mounting bracket 34 as is well known in the art. This bracket 34 preferably enables both steering and tilt and trim such that the outboard motor 10 may be steered about a substantially vertical axis and tilted or trimmed about a substantially horizontal axis in manners well known to those skilled in the art. As the mounting arrangement is relatively unimportant to the cooling arrangement, and as the mounting arrangement is well known to those of ordinary skill in the art, further description of such will be omitted.

With continued reference to FIG. 1, the engine 22 is preferably mounted within the engine compartment 20. In the illustrated embodiment, the engine 22 is substantially vertically oriented. For instance, an axis of a crankshaft 36 may be substantially inclined such that it extends along a generally vertical axis when the outboard motor is tilted into an operating position. In other embodiments, the engine may be oriented such that the crankshaft extends in a generally horizontal direction or in any direction having an inclination angle between horizontal and vertical.

Figure 2:
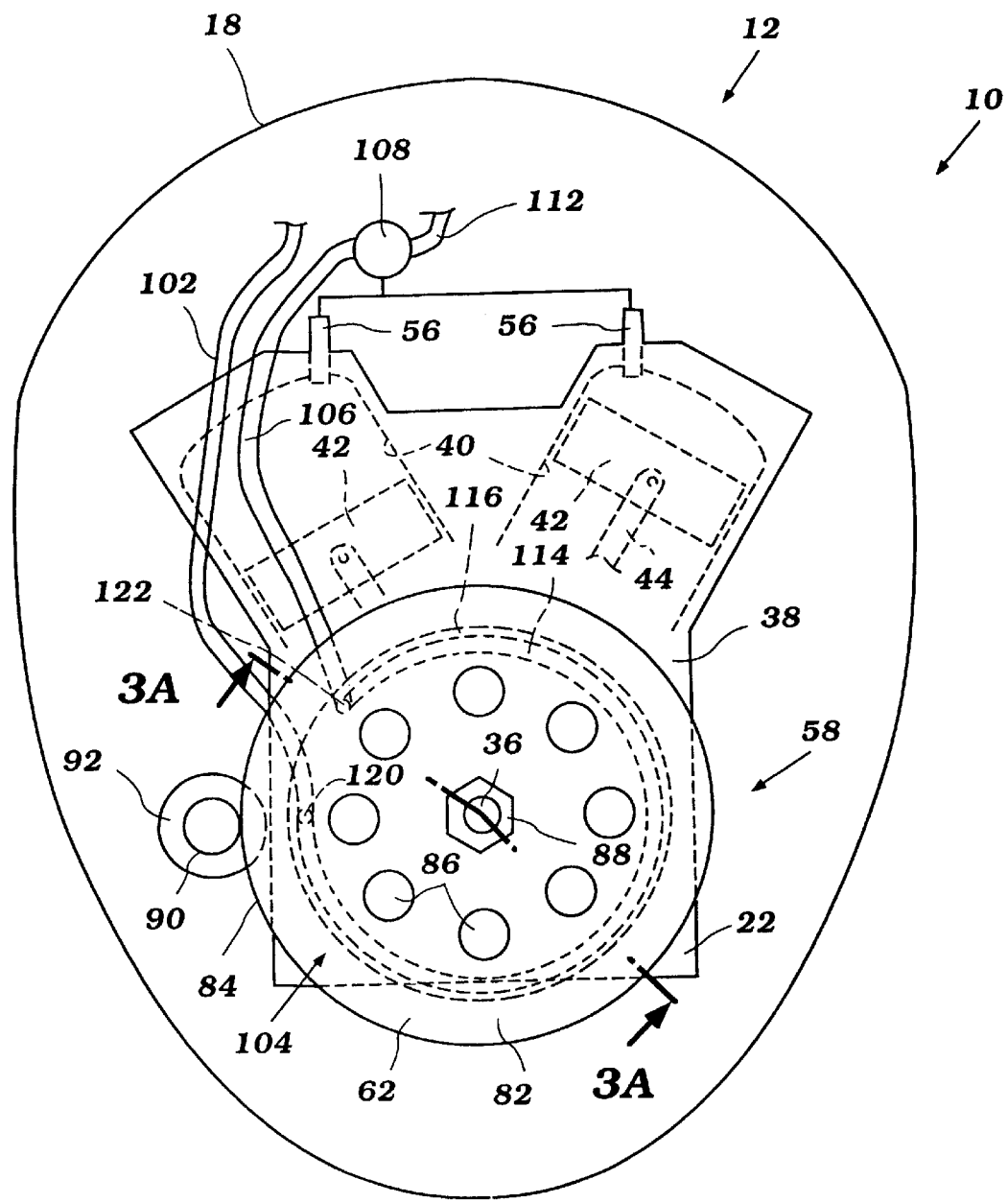
FIG. 2 is a top view of the outboard motor of FIG. 1 with certain internal components illustrated with hidden lines.

With reference now to FIGS. 1 and 2, the illustrated engine 22 generally comprises a cylinder block 38 having a plurality of cylinder bores 40. The cylinders may also be formed with sleeve inserts (not shown). The inserts may increase the durability and efficiency of the engine 22. In some embodiments, the engine 22 may contain as few as one cylinder or more than two cylinders. In the illustrated embodiment, the engine 22 comprises two banks of three cylinders configured in a V-type arrangement.

The engine 22 may operate on any known operating principle. The illustrated engine 22 preferably operates on a four-cycle principle. It is anticipated, however, that the present cooling arrangement may also be used with two-stroke engines and rotary type engines. The configuration of the cylinders and the operational characteristics of such engines being relatively unimportant to the functioning of the cooling arrangement described below.

With continued reference to FIG. 2, pistons 42 are contained within the illustrated cylinders 40 and are configured for reciprocating translation within the cylinders 40. The pistons 42 may be manufactured in any known manner and may receive piston rings of any suitable configuration and arrangement. The pistons 42 are coupled to the crankshaft 36 by connecting rods 44, as is well known to those of skill in the art. Thus, the pistons 42 drive a crankshaft 36 to create a rotational power output from the engine 22.

The illustrated crankshaft 36 is preferably coupled to a downwardly extending driveshaft 46 in any suitable manner. Of course, in other embodiments, the driveshaft may extend is any direction; however, in the environment of the outboard motor, the driveshaft 46 has a generally vertical axis of rotation. Accordingly, the driveshaft 46 is powered for rotation by the engine 22 through the crankshaft 36.

The rotation of the driveshaft 46, in turn, drives a coolant pump 48 and a propeller 50 in the illustrated embodiment. The illustrated propeller 50 is driven in both a forward direction and a reverse direction through the shiftable transmission 52. In the illustrated embodiment, this shiftable transmission generally comprises a selectable bevel gear arrangement. The selectable bevel gear arrangement preferably couples the drive shaft 46 to a propeller shaft 54 and, ultimately, the propeller 50. These components are journaled for rotation in any suitable manner, such arrangements being well known to those of ordinary skill in the art.

With reference to FIG. 2, the illustrated engine 22 comprises a fuel-injection system having a fuel injector 56 positioned in each cylinder such that the fuel injector supplies a fuel charge to each combustion chamber in any suitable manner. While the illustrated engine 22 employs direct injection (i.e., fuel is injected directly into the engine), it is anticipated that other methods of supplying an air and fuel charge to the combustion chamber may also be used. For instance, but without limitation, the engine 22 may employ an indirect injection system or a carburetted-type of induction system. As such, any suitable induction system may be used with the engine employing the present generator cooling structure.

With continued reference to FIGS. 1 and 2, the engine 22 further comprises an electrical generator 58 that is directly mounted to the crankshaft 36. In other embodiments, the electrical generator 58 may be connected to the crankshaft 36 through any suitable connection such that the rotational power from the engine 22 may be transferred to the generator 58. As described above, and as illustrated in FIG. 3A, the generator 58 generally comprises a stationary armature 60 and a rotating rotor 62. In some embodiments, the coil or armature may be rotated about the stationary magnetic field. In such embodiments, the cooling arrangement may be positioned adjacent to the moving armature or coil.

Figure 4:
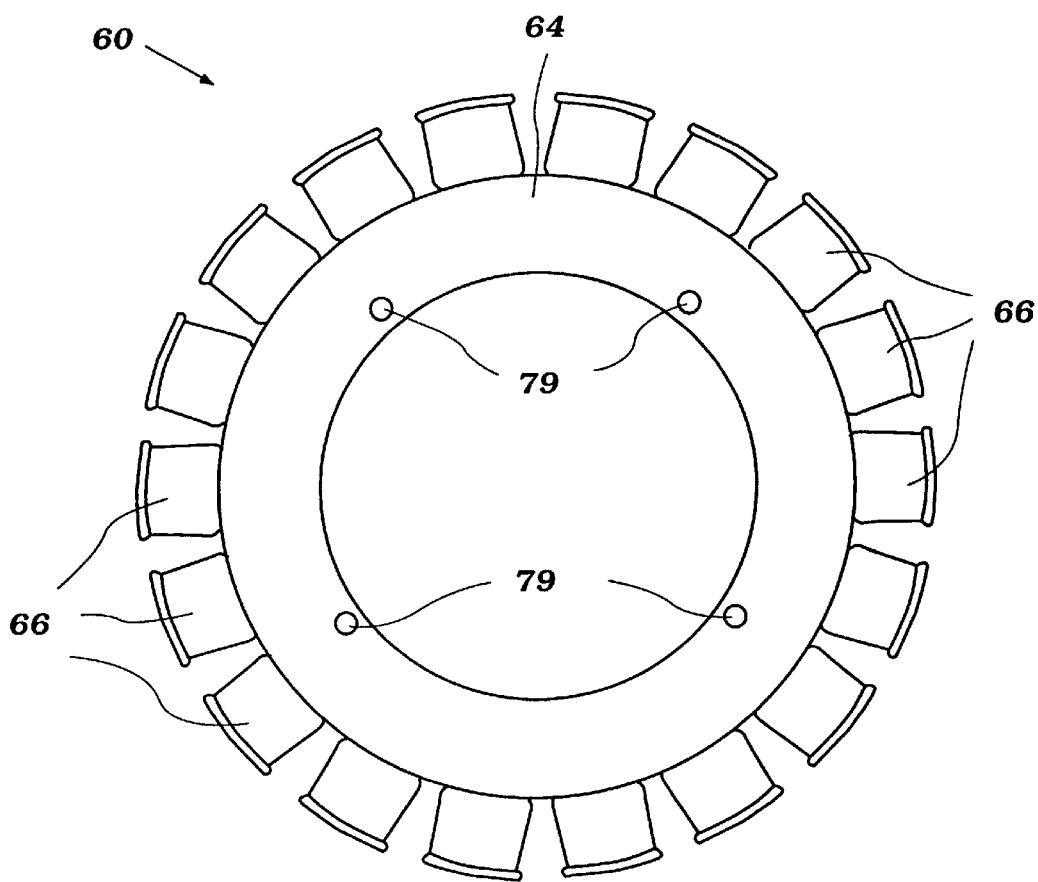
FIG. 4 is a top view of a rotor for use in the generator of FIG. 1.
Figure 5:
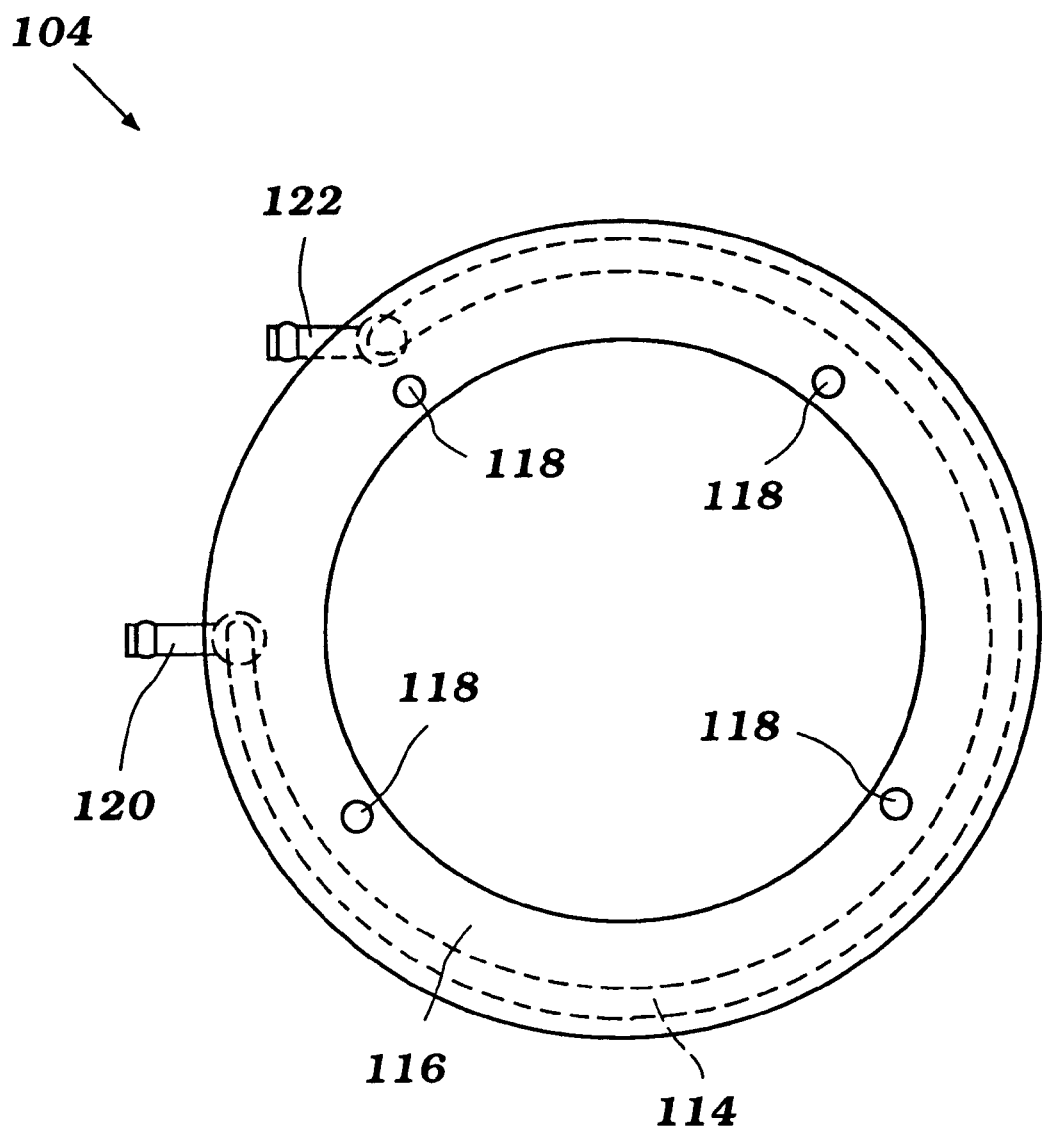
FIG. 5 is a top view of a cooling jacket for use in the generator of FIG. 1.

With reference to FIG. 4, the armature 60 generally comprises a stator 64 having a plurality of coils 66. The stator 64 is preferably mounted to remain stationary relative to the rotational movement of the rotor 62. Such a mounting facilitates direct connection of electrical connections to the coils 66, which are wrapped around an outer periphery of the frame or stator 64. The coils 66 may be formed of any suitable conductive material. In one embodiment, the coils are copper or a copper alloy. As is known, the coils 64 of the illustrated embodiment are connected to the electrical components of the vehicle. As the rotor 62 passes the coils, a current develops within the wires forming the coils and electrical power is generated.

Figure 3A:
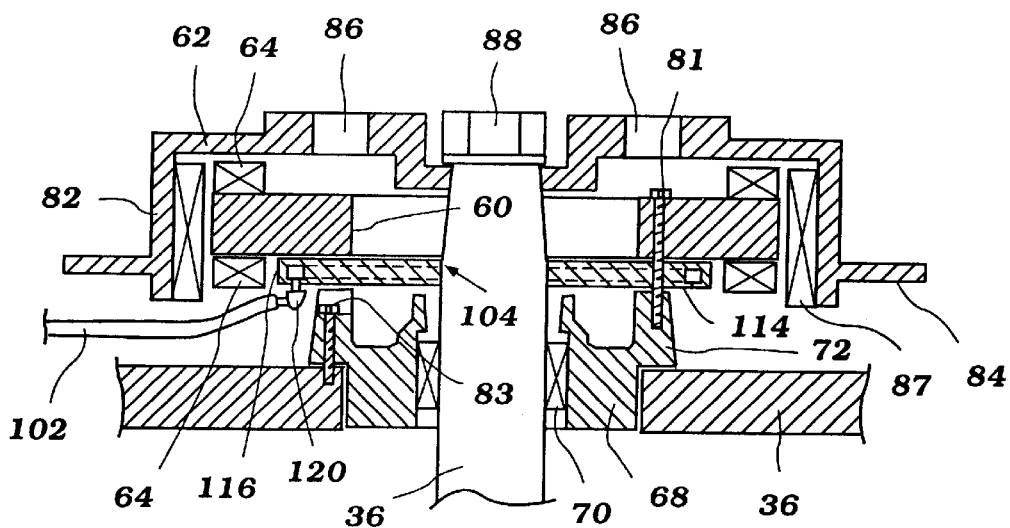
FIG. 3A is an enlarged partially sectioned side view taken along line 3A—3A in FIG. 2 illustrating a generator having a cooling arrangement having features, aspects and advantages in accordance with the present invention.
Figure 3B:
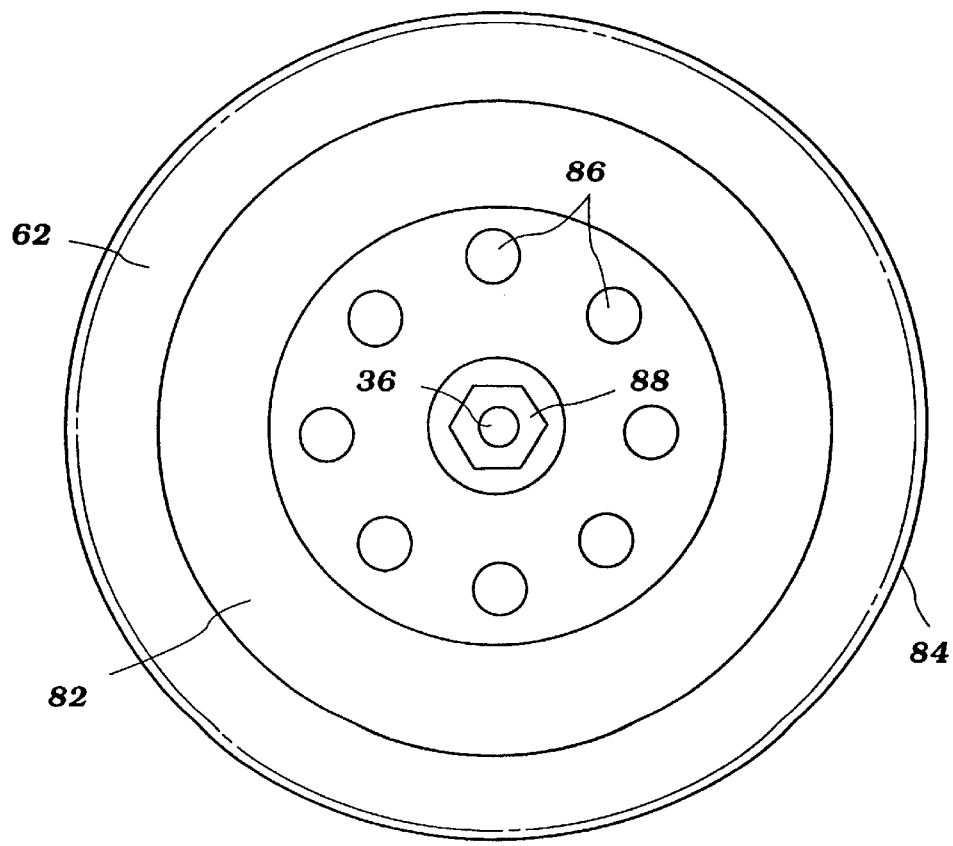
FIG. 3B is a top view of the generator and cooling arrangement of FIG. 3A.
Figure 6:
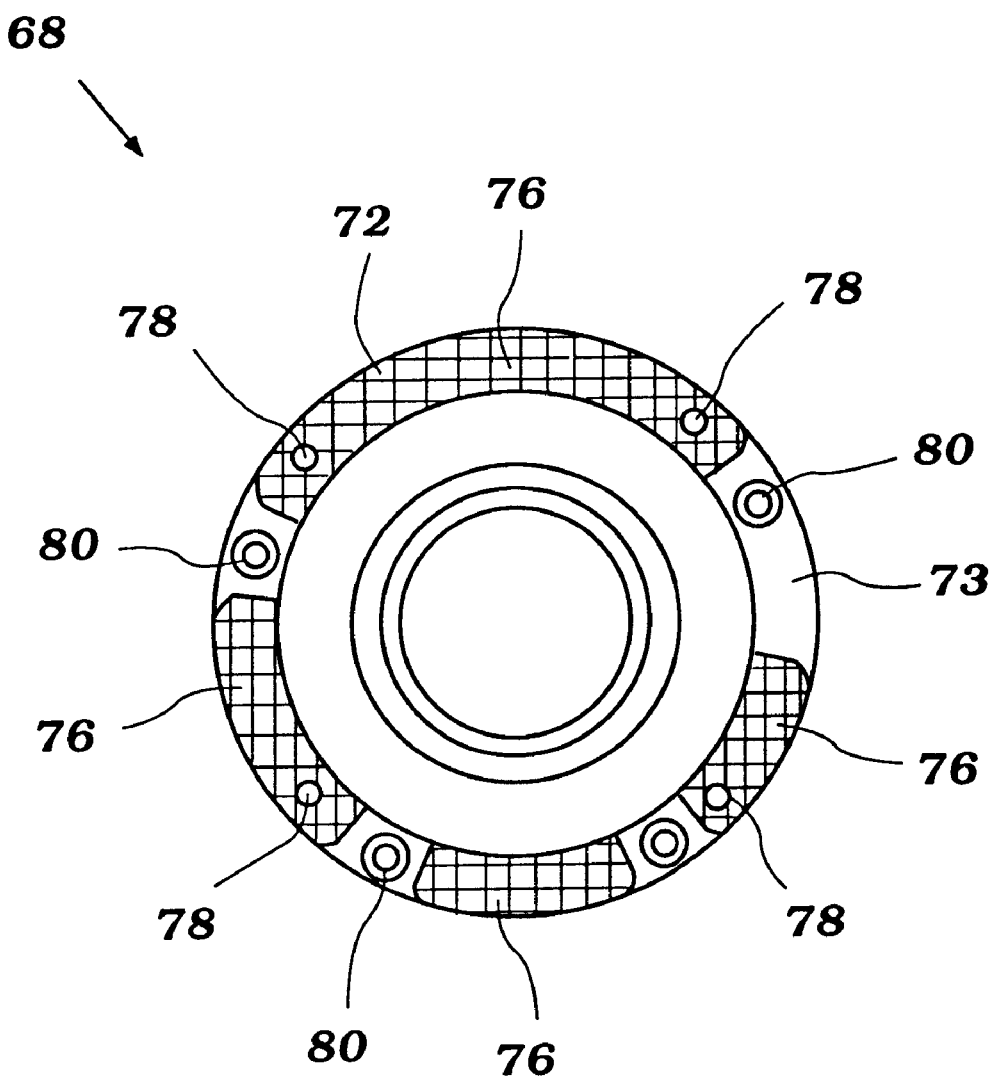
FIG. 6 is a top view of a stator mounting hub for use in the generator of FIG. 1.

With reference now to FIGS. 3A and 6, a mounting arrangement for the stator and armature will be described. As illustrated, the stator 64 is preferably mounted to be stationary through the use of a bearing housing 68. The bearing housing 68 preferably carries a set of bearings 70 that journal a portion of the crankshaft 36 that drives the rotor 62 in the illustrated embodiment. As illustrated, the bearing housing 68 comprises a plurality of elevated stator support 72 and a plurality of mounting recesses 74 interposed between the elevated stator supports 72. Other configurations of supports and mounting positions are also possible; however, the illustrated embodiment provides the advantage of compactly arranging the stator support and securely mounting the stator support to a stationary surface.

The stator supports 72 generally form a set of substantially planar surfaces 76 that together define a mounting plane that is spaced from the mounting recesses 74 of the bearing housing 68. Additionally, this elevated arrangement increases a spacing distance between the coils 64 of the armature 60 and the cylinder block 36 or other engine surface. The construction of the illustrated stator supports 72 provides at least as much surface area in contact with the stator 64 as the conventional mounting arrangement. In the illustrated embodiment, each of the upper surfaces 76 extends preferably at least about 15 degrees about the circumference. In some embodiments, each of the upper surfaces 76 extends at least about 20 degrees about the circumference and, in one specific embodiment, each of the upper surfaces extends about 30 degrees about the circumference. Additionally, preferably the distance from a center point to the upper surfaces 76 in an axial direction is less than the circumferential length of the upper surfaces. The resultant length of the upper surfaces 76 combined with their girth creates a larger surface area as compared to convention mounting arrangements. It should be appreciated that, while the illustrated supports 72 generally form a ring-like structure, the supports 72 may be a square, a rectangle, a triangle, a solid surface or any other structure creating a stable mounting base for the stator 64.

Mounting apertures 78 formed in the supports 72 allow the stator 64 to be secured to the supports 72. Preferably, the apertures are threaded and may or may not extend completely through the bearing housing. The apertures 78 are generally aligned with apertures 79 extending through the stator 64 of the armature 60 such that bolts or other threaded fasteners 81 may be used to connect the two together. Additionally, the apertures 78 may be symmetrically arranged about the central axis of the bearing housing 68 or may be staggered as desired. In the illustrated embodiment, the apertures 78 offset a plurality of holes 80 that are used to attach the bearing housing to the engine 22. A corresponding plurality of threaded fasteners 83 attach the illustrated bearing housing 68 to the engine 22. Other mounting arrangements, of course, may also be used. The illustrated bearing housing 68 features a plurality of paired apertures 78 and holes 80. Additionally, while four mounting holes and apertures are illustrated, any number of holes and apertures resulting in a stable mounting arrangement may be used.

With reference again to FIG. 3A, the rotor 62 is mounted vertically above the stator 64 and armature 60 in the illustrated embodiment. While it is envisioned that the stator 64 and rotor arrangement 62 may be turned on its side, some advantages accrue from the vertical arrangement. For instance, the illustrated rotor 62 generally comprises a circular rotor body 82 having a geared surface 84 arranged about its periphery and plurality of generally vertically extending holes 86 extending through the rotor body 82. In the vertical arrangement, the holes 86 are generally arranged higher than the stator 64 of the armature 60. Thus, cooling air may flow downward through the holes while a current of heated air may flow upward through the holes. Accordingly, the vertical arrangement desirably increases the heat transfer from the stator body 64 in the illustrated embodiment.

Additionally, the rotor body 82 includes a plurality of magnets 87 attached to an inner surface of the rotor body 82 such that the magnets 87 pass the coils 64 of the armature 60 to create the current in the armature 60. Moreover, the magnets are preferably arranged to have opposing polarities to the magnets on either side (i.e., N-S-N-S-N . . . ).

The rotor body 82 is affixed to a portion of the crankshaft 36, or a shaft coupled thereto, such that the rotor 62 rotates about a central axis when the crankshaft 36 turns. In the illustrated embodiment, the rotor 62 is bolted to the crankshaft 36 with a nut or bolt or some other type of threaded fastener 88. Of course, other methods of attachment may also be used, such methods being understood by those of ordinary skill in the relevant arts. As the illustrated rotor 62 is affixed to the crankshaft 36, rotation of the rotor 62 will result in a corresponding rotation of the crankshaft 36. Accordingly, a starter motor 90 having a geared surface 92 driven by the motor 90 and engaged with the geared surface 84 of the rotor 62 may be used to start the engine by providing an initial spin of the crankshaft 36 as desired. It is anticipated, however, that the engine may also be manually started or an alternative starter motor arrangement may also be utilized.

With reference again to FIGS. 1 and 2, one embodiment of the present cooling arrangement will be described in detail. One of ordinary skill in the art will readily be able to determine the required throughput of the cooling system to adequately cool the components desired to be cooled. As described above, the coolant pump 48 of the illustrated embodiment is advantageously driven by the driveshaft 46. As such, the coolant pump may be of any suitable construction, including, but not limited to, a gear pump or a rotary pump. The coolant pump 48 draws water from the operating environment in the illustrated embodiment through a water inlet port 100. In other embodiments, the coolant may be drawn from a reservoir through an inlet port positioned within the coolant reservoir. Preferably, the inlet port 100 is screened to reduce the amount of foreign particulate matter that may be drawn into the cooling system from the reservoir or operating environment.

The pump 48 pumps the coolant upward through a supply conduit 102. In the illustrated embodiment, best shown in FIG. 2, the supply conduit 102 directly transfers the coolant to a cooling jacket 104 arranged and configured to cool the generator 58. In other embodiments, the supply conduit 102 may supply the coolant to cooling jackets extending through the engine 22 or its exhaust system before the coolant is transferred to the generator 58. In yet other embodiments, the coolant may be divided into two distinct paths, one through the generator 58 and one through the balance of the engine 22 and its components. The cooling jacket 104 may be positioned adjacent to the armature and may be positioned either between the armature and the rotor or such that the armature is interposed between the cooling jacket and the rotor.

Following circulation through the cooling jacket 104, which will be described in greater detail below, the coolant is exhausted to a transfer conduit 106. The transfer conduit 106 supplies the coolant to a high pressure pump 108, which is utilized to supply fuel to the fuel injection system, before the coolant is passed to a exhaust port 110 through a discharge conduit 112. As is known, in this manner the illustrated embodiment allows the coolant to cool the fuel being supplied to the fuel injectors through the high pressure fuel pump 108. Other components may also be cooled prior to or following the introduction of the coolant to the water jacket 104 positioned within the generator 58. Moreover, while the exhaust port releases the coolant back into the operating environment, it is also possible to exhaust the coolant with the exhaust gases or through a radiator into a reservoir. Other variations will also be readily apparent to those of ordinary skill in the art depending upon the application in which the present cooling arrangement will be used.

With reference now to FIGS. 2, 3A, 3B and 5, the cooling jacket 104 will be described in greater detail. As illustrated, the cooling jacket 104 is provided with a coolant conduit 114 that extends through a large portion of the entire circumference of the cooling jacket 104. In some embodiments, the conduit 114 may extend less than about 270 degrees of a circular cooling jacket 104. In other embodiments, the conduit may extend between about 270 degrees and about 330 degrees of the entire circumference of a circular cooling jacket 104. In yet other embodiments, the conduit 114 may pass through as much of the cooling jacket 104 as possible while allowing in inlet and outlet to be positioned in the cooling jacket. Preferably, the conduit 114 is positioned to be centrally disposed along the stator body 64 to effect the greatest possible heat transfer from the stator body 64. It is anticipated that embodiments in which the conduit 114 is not so disposed may also be useful; however, the greatest efficiency comes from positioning the conduit relative to a central portion of the body of the stator.

The illustrated cooling jacket generally comprises a body 116 formed about the conduit 114. The illustrated body 116 is ring-like in structure. It is anticipated that any of a variety of geometric shapes may be used for the body 116. Preferably, the body 116 is designed, sized and configured to facilitate a large heat transfer away from the stator body 64. The body may be manufactured from any suitable material, including, but not limited to, aluminum, brass, copper, or other metals and metal alloys, or a resin-based material. The illustrated body 116 also includes a plurality of through holes 118 that correspond to the holes in the stator 64 and the stator support 72. The threaded fasteners 81 attach the cooling jacket 104 to the stator support 72 between the support 72 and the armature 60.

The illustrated cooling jacket also includes an inlet nipple 120 and an outlet nipple 122. The nipples 120, 122 connect the conduit 114 to the supply conduit 102 and transfer conduit 106 in the illustrated embodiment. Desirably, the nipples 120, 122 are of the quick-connect type but they may be any suitable type facilitating the coupling of two fluid conduits or passages.

Figure 7:
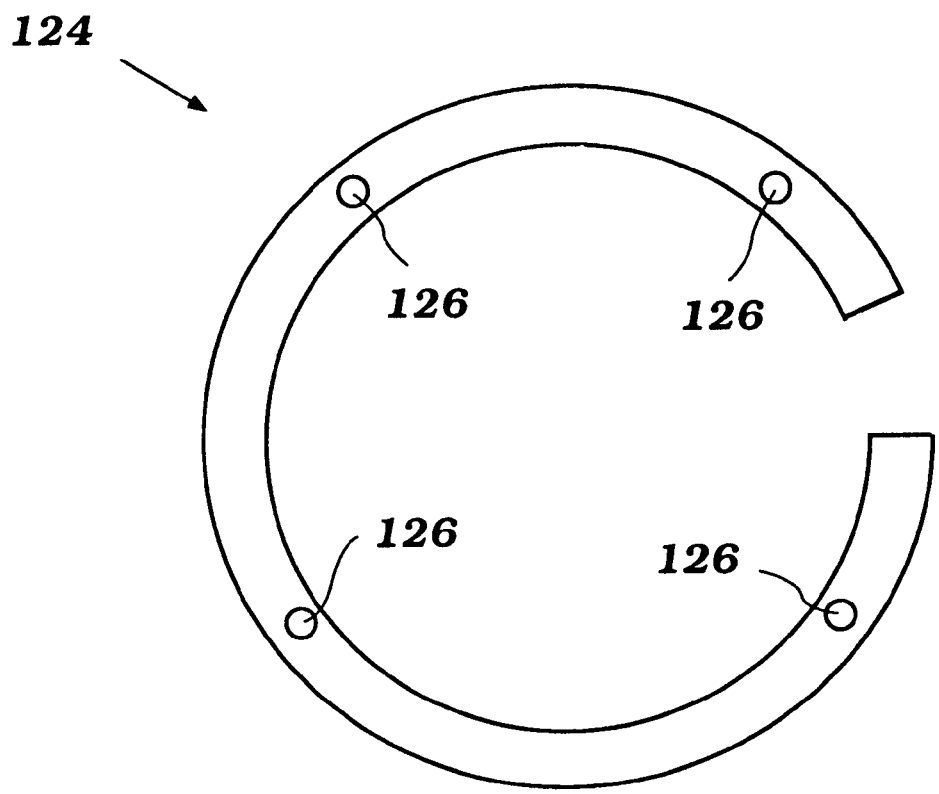
FIG. 7 is a top view of an aluminum spacer for use in a generator cooling system having certain features, aspects and advantages in accordance with the present invention.

With reference now to FIG. 7, a spacer member is illustrated therein. The spacer, indicated generally by the reference number 124, is desirably sized and configured for insertion between the armature 60 and the stator support 72. The illustrated spacer member 124 is ring-like in structure. It is anticipated that any of a variety of geometric shapes may be used for the spacer member 124. Preferably, the spacer member 124 is designed, sized and configured to facilitate a large heat transfer away from the stator body 64. The spacer member 124 may be manufactured from any suitable material, including, but not limited to, aluminum, brass, copper, or other metals and metal alloys. Desirably, the material is conductive of heat and facilitates heat transfer from the stator 64 and stator coils 66 to the stator support 72. Specifically, a metallic material, such as aluminum or copper, having a good thermal conductivity is presently preferred. The illustrated spacer member 124 also includes a plurality of through holes 126 that correspond to the holes in the stator 64 and the stator support 72. The threaded fasteners 81 attach the spacer member 124 to the stator support 72 between the support 72 and the armature 60. Thus, the spacer member 124 may be used in conjunction with, or as an alternative to, the cooling jacket 104 described in detail above.

Although the present invention has been described in terms of a certain embodiments, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. An outboard motor comprising an engine, a crankshaft extending from the engine in a generally vertical direction, a bearing housing supporting a bearing that journals a portion of the crankshaft, a generator positioned proximate the portion of the crankshaft, the generator comprising an armature and a rotor, the armature supported by the bearing housing, the armature comprising a stator and a plurality of coils, and a heat transfer element positioned between the stator and the bearing housing.

2. The outboard motor of claim 1, wherein the rotor is coupled to the crankshaft and rotates relative to the armature.

3. The outboard motor of claim 1, wherein the heat transfer element comprises a thermally conductive spacer element.

4. The outboard motor of claim 3, wherein the heat transfer element further comprises a coolant conduit through which coolant is capable of flowing.

5. The outboard motor of claim 1, wherein the heat transfer element comprises a coolant conduit through which coolant is capable of flowing.

6. The outboard motor of claim 1, wherein the rotor is capable of engagement with a starter motor.

7. The outboard motor of claim 1, wherein the rotor is selectively driven by a starter motor.

8. The outboard motor of claim 1, wherein the bearing housing comprises a stator support, the stator support having at least one planar surface formed in a parallel plane to a plane defined by a lower surface of the stator.

9. The outboard motor of claim 8, wherein the stator support is generally ring-like.

10. The outboard motor of claim 9, wherein the stator support is generally circular.

11. The outboard motor of claim 1, wherein the rotor has a disc-shape.

12. The outboard motor of claim 1, wherein the rotor has a dish-shape with at least one magnet positioned within the dish-shape on an undersurface of the rotor.

13. The outboard motor of claim 1, wherein the rotor is positioned generally vertically above the stator.

14. The outboard motor of claim 13, wherein the rotor further comprises at least one aperture extending through the rotor in a generally vertical direction.

15. A generator and cooling arrangement comprising a rotor and an armature, the rotor having at least one surface facing the armature, the rotor carrying at least one magnet on the surface facing the armature, the armature comprising a stator and a plurality of coils attached to the stator, the coils positioned in close proximity to a circumference defined through the magnet from a center of rotation of the magnet about the armature, a cooling member positioned adjacent a surface of the armature extending among the plurality of coils, the cooling member having a component made of a thermally conductive material.

16. The generator and cooling arrangement of claim 15, wherein the cooling member is positioned to one side of the armature and the rotor is positioned to the other side of the armature.

17. The generator and cooling arrangement of claim 16, wherein the cooling member comprises a cooling jacket capable of carrying a flow of coolant therethrough.

18. The generator and cooling arrangement of claim 16, wherein the cooling member comprises a spacer member.

19. The generator and cooling arrangement of claim 16, wherein the rotor is capable of being directly coupled to a crankshaft of an engine.

* * * * *